US005964663A

United States Patent [19]

Stewart et al.

[11] Patent Number: 5,964,663

[45] **Date of Patent: *Oct. 12, 1999**

[54] DOUBLE DIAPHRAGM COMPOUND SHAFT

[75] Inventors: Matthew J. Stewart, Thousand Oaks; Kenneth G. Roberts, Simi Valley; Dennis H. Weissert, Sunland; Robert W. Bosley, Cerritos, all of Calif.

[73] Assignee: Capstone Turbine Corp., Woodland Hills, Calif.

[ * ] Notice: This patent is subject to a terminal disclaimer.

[21] Appl. No.: 08/934,430

[22] Filed: Sep. 19, 1997

[51] Int. Cl.[6] ........ F16D 3/76

[52] U.S. Cl. ........ 464/98; 415/216.1; 464/182

[58] Field of Search ........ 464/98, 51, 179, 464/180, 182, 183; 74/607; 415/216.1; 416/244 R, 244 A; 417/423.7, 423.1, 423.6

[56] References Cited

U.S. PATENT DOCUMENTS

| | | | |
|---|---|---|---|
| 1,283,787 | 6/1918 | Jencick . | |
| 1,460,212 | 6/1923 | Olive | 464/98 |
| 2,300,689 | 11/1942 | Nagle | 415/216.1 X |
| 2,483,616 | 10/1949 | Bergstedt | 464/179 X |
| 2,625,883 | 1/1953 | Howser | 415/216.1 X |
| 2,848,882 | 11/1958 | Larsen et al. . | |
| 3,299,722 | 1/1967 | Bodine . | |
| 3,448,591 | 6/1969 | Spyra . | |
| 3,500,754 | 3/1970 | Boes et al. . | |
| 3,635,050 | 1/1972 | Plummer | 464/98 |
| 3,779,451 | 12/1973 | Lehman . | |
| 3,788,099 | 1/1974 | Miller | 464/98 |
| 3,834,183 | 9/1974 | Muller | 464/51 |
| 3,855,817 | 12/1974 | Stuemky et al. | 464/51 |
| 3,902,333 | 9/1975 | Dossier | 464/182 |
| 3,973,867 | 8/1976 | Lee | 415/216.1 X |
| 4,044,628 | 8/1977 | Jacks | 464/98 |
| 4,121,532 | 10/1978 | Coryell | 464/182 |
| 4,125,344 | 11/1978 | Tiefenbacher | 416/244 A X |
| 4,176,519 | 12/1979 | Kronograd . | |
| 4,230,438 | 10/1980 | Lehmann et al. | 415/216.1 |
| 4,407,631 | 10/1983 | Schneider et al. | 415/216.1 X |
| 4,659,245 | 4/1987 | Hirao et al. | 416/244 A X |
| 4,795,012 | 1/1989 | Duram . | |
| 4,934,138 | 6/1990 | Boyd . | |
| 5,577,963 | 11/1996 | Stretch | 464/51 |
| 5,697,848 | 12/1997 | Bosley | 464/98 |

FOREIGN PATENT DOCUMENTS

| | | | |
|---|---|---|---|
| 57-171122 | 10/1982 | Japan | 464/180 |

*Primary Examiner*—Eileen D. Lillis
*Attorney, Agent, or Firm*—Albert J. Miller

[57] ABSTRACT

A compound shaft coupling having a flexible disk shaft, with two flexible disks or diaphragms, and a tie bolt shaft connecting two rigid or stiff shafts. One flexible disk diaphragm of the flexible disk shaft is coupled with an interference fit to the first stiff shaft, while the other flexible disk diaphragm of the flexible disk shaft is coupled with an interference fit to the tie bolt shaft which removably mounts the second stiff shaft. A quill shaft connects the two flexible disk diaphragms of the flexible disk shaft. The first stiff shaft can be a hollow sleeve with a magnet mounted therein and the second stiff shaft or power head shaft may include a compressor wheel, a bearing rotor, and a turbine wheel removably mounted on the tie bolt shaft.

14 Claims, 4 Drawing Sheets

DOUBLE DIAPHRAGM COMPOUND SHAFT

TECHNICAL FIELD

This invention relates to the general field of shafts for rotating machinery and more particularly to an improved compound shaft that includes a double flexible diaphragm shaft between two relatively rigid or stiff shafts which together form the compound shaft.

BACKGROUND OF THE INVENTION

In rotating machinery, various rotating elements such as compressor wheels, turbine wheels, fans, generators, and motors are affixed to a shaft upon which they rotate. The shaft can be a single piece unitary structure of nearly constant diameter or it can be a compound structure having two or more relatively rigid or stiff shaft elements connected by one or more relatively flexible shaft elements. A single piece shaft machine would typically have its shaft supported by two journal bearings and a bidirectional thrust bearing. A two stiff shaft element compound shaft machine would typically have each of its stiff shaft elements supported by two journal bearings (for a total of four journal bearings) and would have either one or two bidirectional thrust bearings (two thrust bearings being required if the relatively flexible shaft element coupling allowed sufficient axial flexibility and both sections require accurate axial position).

Until recently, the rotating machinery industry generally had considered that it was impractical to support high speed turbomachinery shafts of either the rigid or compound type on three journal bearings owing to the difficulty of holding three bearings in straight alignment, together with the large shaft and bearing stresses that result when bearing misalignment occurs. Recent improvements in flexible shaft elements have, however, made such combinations possible and single flexible disk diaphragm shafts haze been successfully employed between two filatively rigid shafts supported by three bearings in straight alignment. An example of this type of structure can be found in U.S. Patent application Ser. No. 08/440,541 filed May 12, 1995 by Robert W. Bosley entitled “Compound Shaft with Flexible Disk Coupling”, now U.S. Pat. No. 5,697,848 issued Dec. 16, 1997.

SUMMARY OF THE INVENTION

In the present invention, the compound shaft generally comprises a first stiff shaft rotatably supported by a pair of journal bearings, a power head shaft or second stiff shaft rotatably supported by a single journal bearing and by a bidirectional thrust bearing, and a flexible disk shaft having two flexible disk diaphragms and a tie bolt shaft connecting the two rigid shafts. One flexible disk diaphragm of the flexible disk shaft is coupled with an interference fit to the first stiff shaft. The other flexible disk diaphragm of the flexible disk shaft is coupled with an interference fit to the tie bolt shaft which removably mounts the second stiff shaft. A quill shaft connects the two flexible disk diaphragms of the flexible disk shaft.

The flexible disk shaft and the tie bolt shaft transfer axial loads from the first stiff shaft to the second stiff shaft and transfers thrust bearing support from the second stiff shaft to the first stiff shaft. The flexible disk shaft and the tie bolt shaft allow the compound shaft to tolerate relatively large misalignments of the three journal bearings from a straight line axis.

The first stiff shaft can be a hollow sleeve with a magnet for a permanent magnet generator/motor mounted therein.

This permanent magnet shaft can have its sleeve’s outer diameter serve as both the motor/generator rotor outer diameter and as the rotating surface for the two spaced compliant foil hydrodynamic fluid film journal bearings mounted at the ends of the permanent magnet shaft. The second stiff shaft or power head shaft may include a compressor wheel, a bearing rotor, and a turbine wheel removably mounted on a tie bolt shaft.

BRIEF DESCRIPTION OF THE DRAWINGS

Having described the present invention in general terms, reference will now be made to the accompanying drawings in which.

DETAILED DESCRIPTION OF THE PREFERRED EMBODIMENTS

Figure 1:
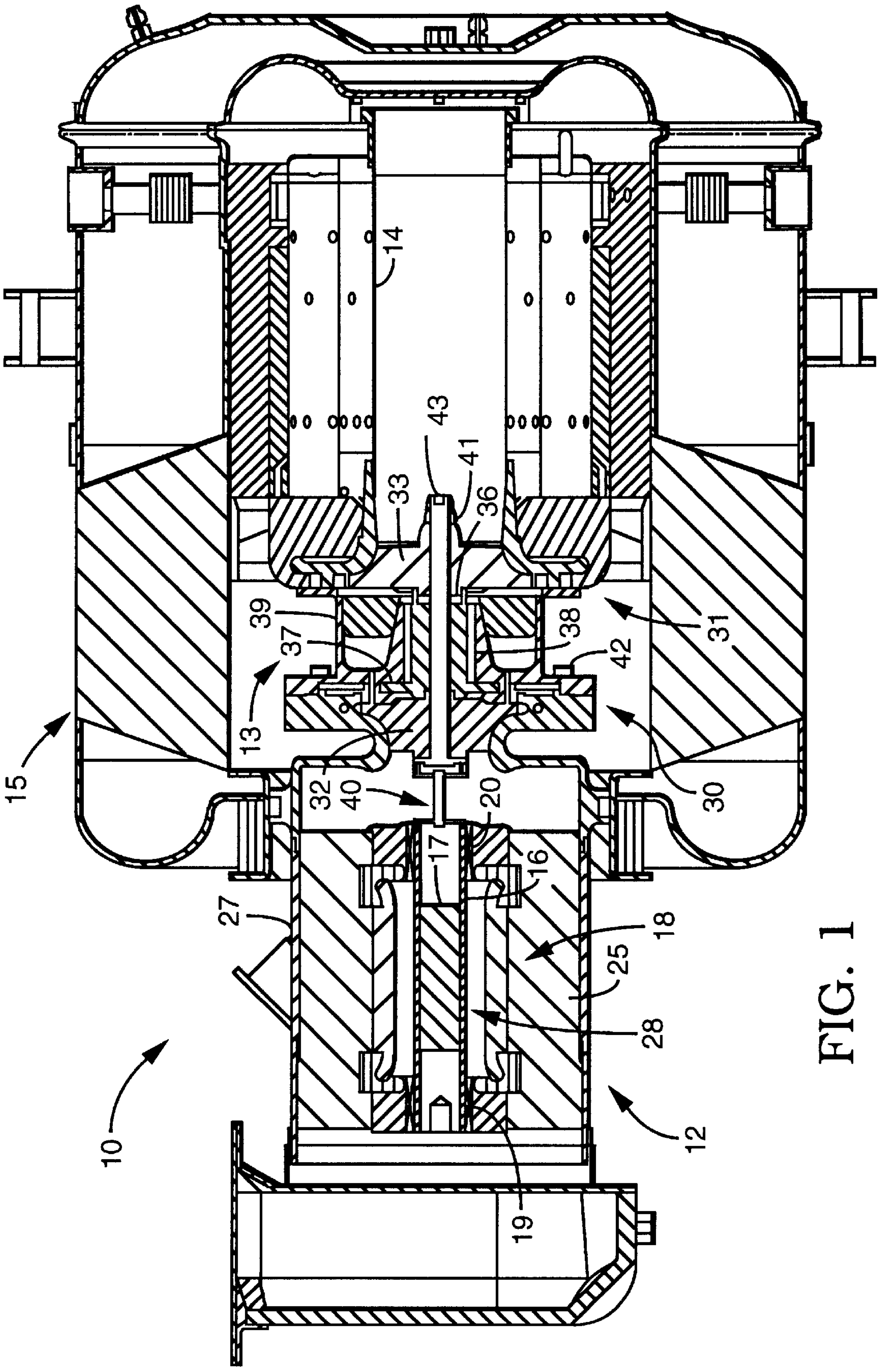
FIG. 1 is a sectional view of a turbomachine having the compound shaft of the present invention.

A permanent magnet turbogenerator 10 is illustrated in FIG. 1 as an example of a turbomachine utilizing the compound shaft of the present invention. The permanent magnet turbogenerator 10 generally comprises a permanent magnet generator 12, a power head 13, and a combustor 14.

The permanent magnet generator 12 includes a permanent magnet rotor or sleeve 16, having a permanent magnet 17 disposed therein, rotatably supported within a permanent magnet stator 18 by a pair of spaced journal bearings 19, 20. Radial permanent magnet stator cooling fins 25 are enclosed in a cylindrical sleeve 27 to form an annular air flow passage to cool the permanent magnet stator 18 and with air passing through on its way to the power head 13.

The permanent magnet sleeve 16 and permanent magnet 17 collectively form the rotatable permanent magnet shaft 28 which is also referred to as the first stiff shaft. The permanent magnet 17 may be inserted into the permanent magnet sleeve 16 with a radial interference fit by any number of conventional techniques, including heating the permanent magnet sleeve 16 and supercooling the permanent magnet 17, hydraulic pressing, pressurized lubricating fluids, tapering the inside diameter of the permanent magnet sleeve 16 and/or the outer diameter of the permanent magnet 17, and other similar methods or combinations thereof.

The power head 13 of the permanent magnet turbogenerator 10 includes compressor 30 and turbine 31. The compressor 30 having compressor wheel 32, which receives air from the annular air flow passage in cylindrical sleeve 27 around the permanent magnet stator 18, is driven by the turbine 31 having turbine wheel 33 which receives heated exhaust gases from the combustor 14 supplied by air from recuperator 15. The compressor wheel 32 and turbine wheel 33 are disposed on bearing rotor 36 having bearing rotor thrust disk 37. The bearing rotor 36 is rotatably supported by a single journal bearing 38 within the power head housing 39 while the bearing rotor thrust disk 37 it axially supported by a bidirectional thrust bearing with one element of the thrust bearing on either side of the bearing rotor thrust disk 37. The power head housing 39 is bolted to a transition structure welded to the cylindrical sleeve 27 by a plurality of spaced bolts 42.

The journal bearings 19, 20, and 38 would preferably be of the compliant foil hydrodynamic fluid film type of bearing, an example of which is described in detail in U.S. Pat. No. 5,427,455 issued Jun. 6, 1995 by Robert W. Bosley, entitled "Compliant Foil Hydrodynamic Fluid Film Radial Bearing" and is herein incorporated by reference. The thrust bearing would also preferably be of the compliant foil hydrodynamic fluid film type of bearing. An example of this type of bearing can be found in U.S. Pat. No. 5,529,398 issued Jun. 25, 1996 by Robert W. Bosley, entitled "Compliant Foil Hydrodynamic Fluid Film Thrust Bearing" and is also herein incorporated by reference.

Figure 2:
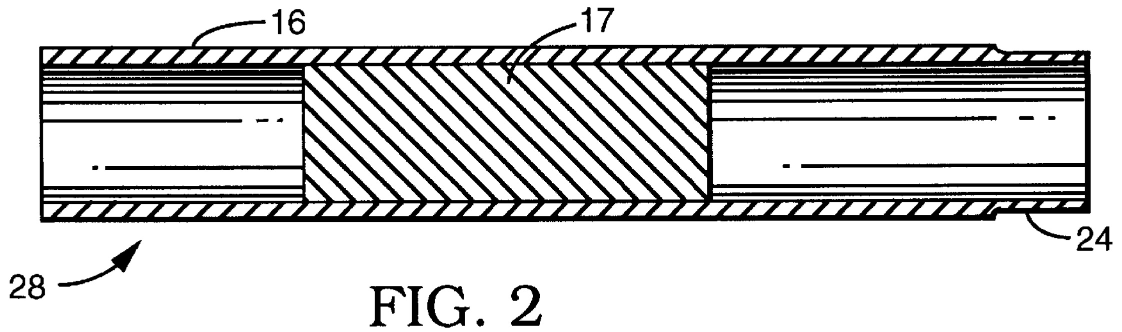
FIG. 2 is an enlarged sectional view of the first stiff shaft or permanent magnet shaft of the compound shaft of the turbomachine of FIG. 1.

The permanent magnet shaft 28 is shown in an enlarged section in FIG. 2. The power head end 24 of the permanent magnet sleeve 16 may have a slightly smaller outer diameter than the outer diameter of the remainder of the permanent magnet sleeve 16. The permanent magnet sleeve 16 can be constructed of a non-magnetic material such as Inconel 718, while the permanent magnet 17, disposed within the permanent magnet sleeve 16, may be constructed of a permanent magnet material such as samarium cobalt, neodymium-iron-boron or similar materials. In addition, cylindrical brass plugs (not shown) may be included at either end of the permanent magnet 17.

Figure 3:
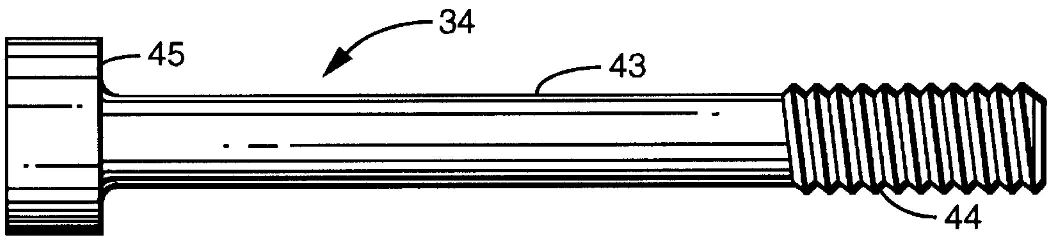
FIG. 3 is an enlarged plan view of the tie bolt shaft of the compound shaft of FIG. 1.

The tie bolt shaft 34 is illustrated in FIG. 3 and generally comprises a tie bolt 43 having a cup shaped member 45 at one end thereof and a threaded portion 44 at the opposite end thereof The open end of the cup shaped member 45 faces away from the tie bolt 43.

Figure 4:
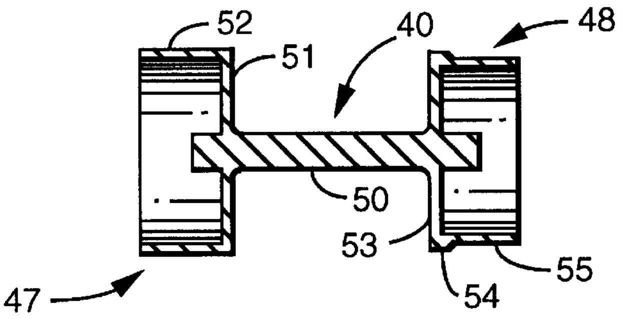
FIG. 4 is an enlarged sectional view of the flexible disk shaft of the compound shaft of the turbomachine of FIG. 1.

The flexible disk shaft 40 is shown in an enlarged sectional view in FIG. 4. The flexible disk shaft 40 includes a first flexible disk member 47 and a second flexible disk member 48 connected by a quill shaft 50. The first flexible disk member 47 is generally cup shaped having a flexible disk 51 and cylindrical sides 52 with the open end of the first flexible disk member 47 facing away from the quill shaft 40. Likewise, the second flexible disk member 48 is also generally cup shaped having a flexible disk 53 and cylindrical sides 54. The open end of the second flexible disk member 48 also faces away from the quill shaft 40 with the power head end 55 having a slightly smaller outer diameter than the remainder of the cylindrical sides 54 of the second flexible disk member 48. The disk members 47, 48 may be of 17-4 PH stainless steel for good strength and fatigue properties.

Figure 5:
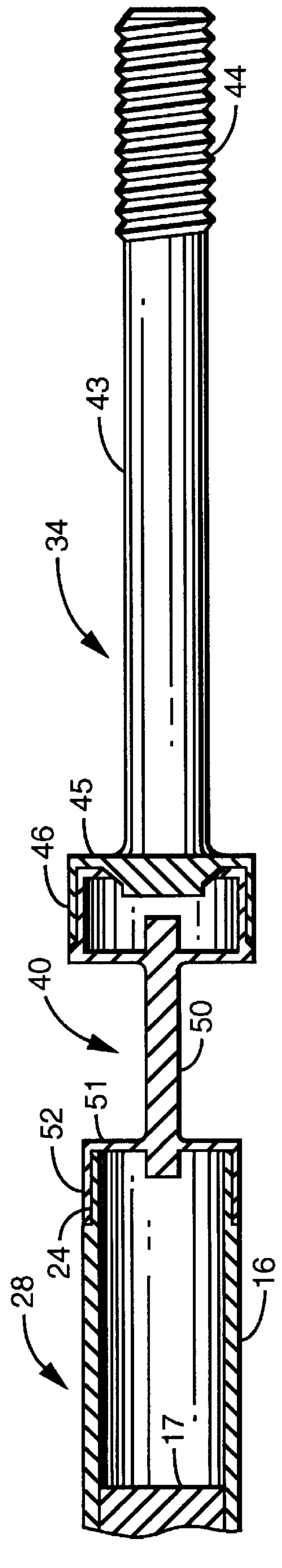
FIG. 5 is an enlarged sectional view of the compound shaft of FIG. 1.
Figure 6:
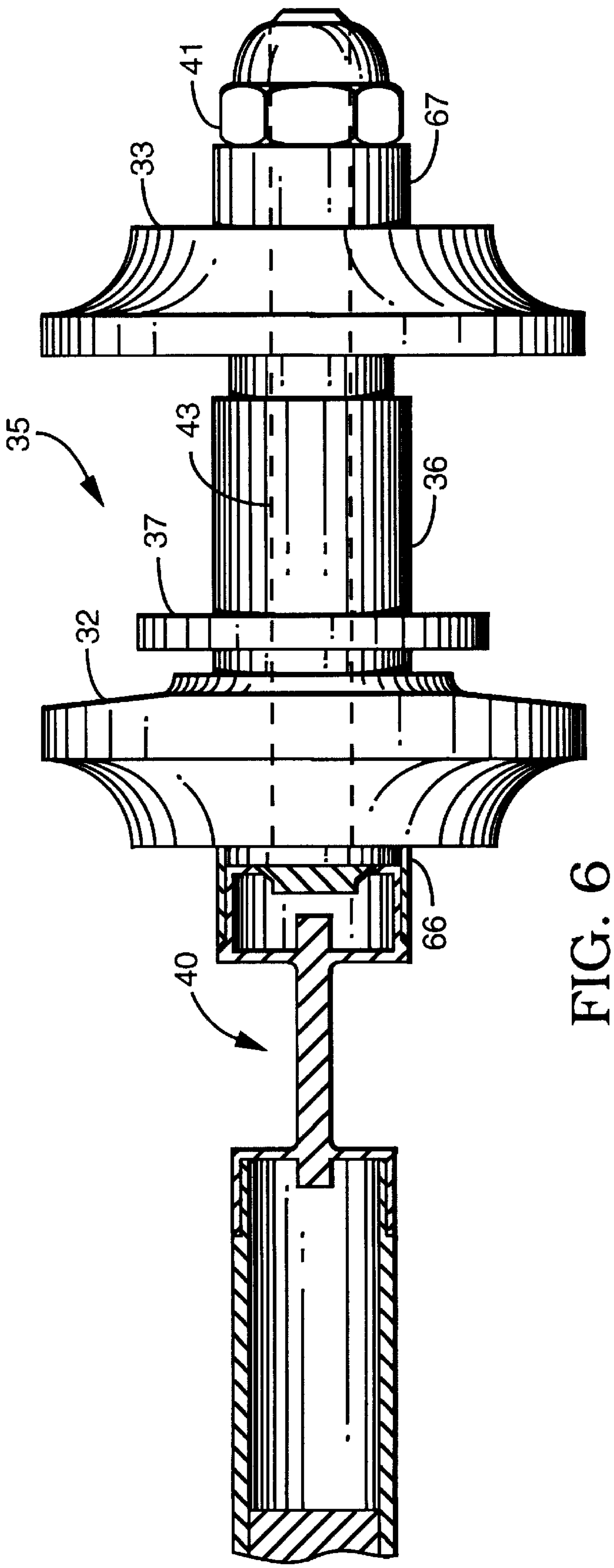
FIG. 6 is an enlarged sectional view of the compound shaft of FIG. 5 illustrating the power head elements mounted on the tie bolt shaft.

The permanent magnet shaft 28 of FIG. 2, the tie bolt shaft 34 of FIG. 3, and the flexible disk shaft 40 of FIG. 4 are shown assembled in FIGS. 5 and 6. The cylindrical sides 52 of the cup-shaped flexible disk member 47 of the flexible disk shaft 40 fit over the power head end 24 of the permanent magnet shaft 28 with an interference fit. By an interference fit is meant an interference of between 0.0002 and 0.005 inches.

Likewise, the cylindrical sides 46 of the cup shaped member 45 of the tie bolt shaft 34 fit over the open end 55 of the second flexible disk member 48 of the flexible disk shaft 40, also with an interference fit.

Figure 7:
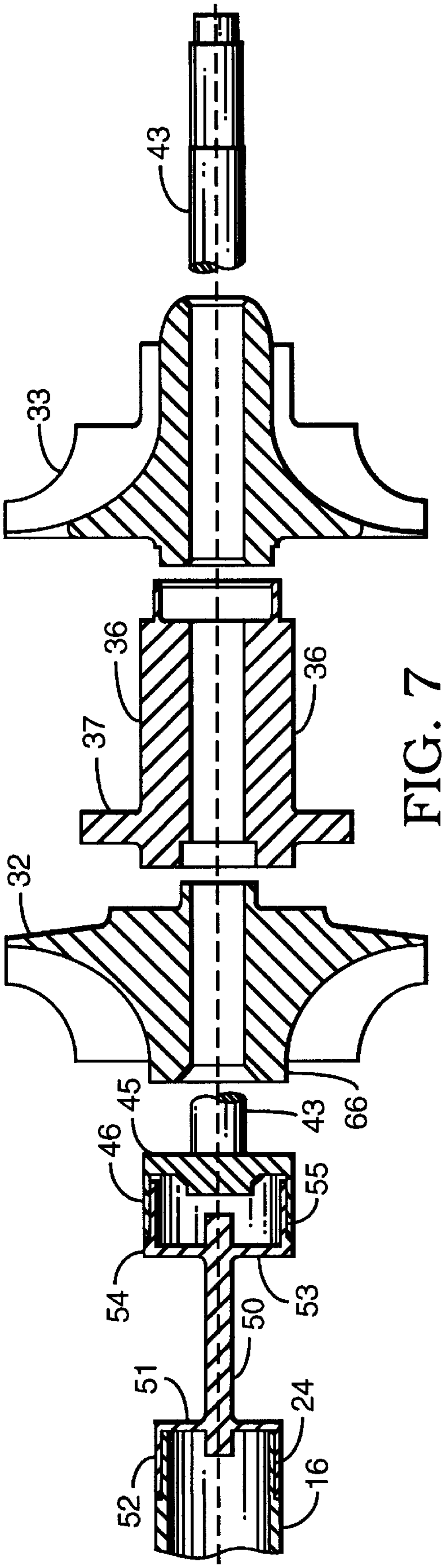
FIG. 7 is an exploded view of the compound shaft of FIG. 5.

As illustrated in FIGS. 6 and 7, the power head shaft 35 generally comprises the hub 66 of the compressor wheel 32, bearing rotor 36 including bearing rotor disk 37, and the hub 67 of the turbine wheel 33. Each of the hub 66 of the compressor wheel 32, bearing rotor 36 including bearing rotor thrust disk 37, and the hub 67 of the turbine wheel 33 include a central bore that fits over the tie bolt 43 of the tie bolt shaft 34. The compressor wheel 32, the bearing rotor 36 and the turbine wheel 33 are held in compression on the tie bolt 43 between the cup shaped member 45 and the tie bolt nut 41 on the threaded end 44 of the tie bolt 43.

As the tie bolt nut 41 is tightened on the threaded end 44 of the tie bolt 43 to hold the compressor wheel 32, bearing rotor 36, and turbine wheel 33 in compression between the tie bolt nut 41 and cup shaped member 45, the tie bolt 43 will be stretched to some degree. This stretching of the tie bolt 43 will force the open end of the cup shaped member 45 to slightly close, that is, the cylindrical sides 46 will narrow towards the open end. This will serve to increase the interference fit between the power head end 55 of the second flexible disk member 48.

Figure 10:
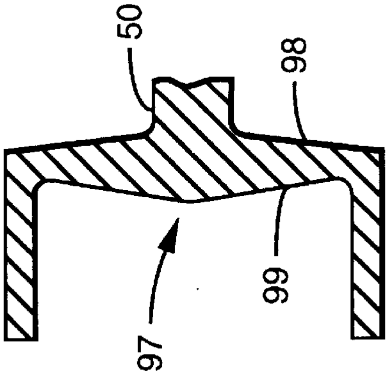
FIG. 10 is a sectional view of yet another alternate flexible disk member for the flexible disk shaft of FIG. 4.
Figure 9:
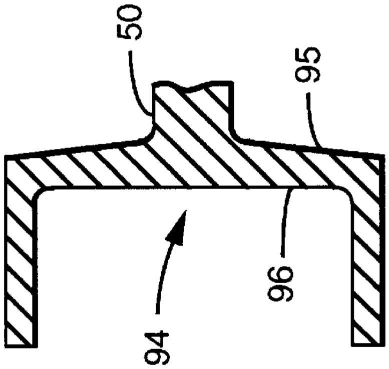
FIG. 9 is a sectional view of another alternate flexible disk member for the flexible disk shaft of FIG. 4.
Figure 8:
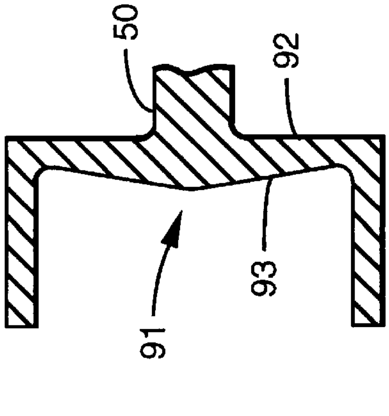
FIG. 8 is a sectional view of an alternate flexible disk member for the flexible disk shaft of FIG. 4.

FIGS. 8–10 illustrate three alternate flexible disk members for the flexible disk shaft of FIG. 4. In these embodiments the thickness of the disk is increased from the cylindrical sides of the flexible disk member to the centerline of the disk. In FIG. 8, the disk 91 includes a flat outer surface 92 facing the quill shaft 50 and a tapered inner surface 93. In FIG. 9, the flexible disk 94 has a tapered outer surface 95 and a flat inner surface 96 while the flexible disk 97 of FIG. 10 has both the outer surface 98 and inner surface 99 tapered.

Having described the various elements of the turbomachine comprising the double diaphragm compound shaft of the present invention, an example of its assembly, installation, and performance will now be described. Thin brass disks are first bonded to each end of the unmagnetized samarium cobalt permanent magnet 17 having a cylindrical shape and having a preferred magnetic axis normal to the cylinder's axis. The permanent magnet assembly with brass end pieces is then ground to obtain a precise outer diameter. It is then installed by thermal assembly techniques or other conventional means into the hollow permanent magnet sleeve 16 which has an internal diameter that is slightly smaller than the permanent magnet assembly outer diameter. The resulting radial interference fit assures that the permanent magnet 17 will not crack due to the tensile stresses that are induced when the permanent magnet assembly and permanent magnet sleeve 16 experience rotationally induced gravitational fields when used in the turbomachine. The permanent magnet sleeve 16 is longer than the permanent magnet assembly such that the permanent magnet sleeve has hollow ends when the permanent magnet assembly is installed therein. The permanent magnet shaft assembly then has its outer surface contoured by grinding. It is then balanced as a component after which the permanent magnet 17 is magnetized. The resulting permanent magnet shaft is a specific example of the first stiff shaft 28 of the present invention.

The second flexible disk 48 of the flexible disk shaft 40 is pressed with an interference fit within the generally cup shaped member 45 of the tie bolt shaft 34. Then the first flexible disk member 47 of the flexible disk shaft 40 is then pressed with an interference fit over the power head end 24 of the permanent magnet shaft 28. The compressor wheel 32, bearing rotor 36 and turbine wheel 33 are then mounted upon the tie bolt 43 of the tie bolt shaft 34 and held in compression by the tie bolt nut 41.

The turbogenerator typically does not require assembly balancing. It may not even need to be checked to determine the state of rotor balance before being put into operation. Typically, when the turbomachine is operated, all the rigid body criticals are negotiated when the machine has accelerated above 40,000 rpm. These negotiated criticals are typically well damped. No flexural criticals need to be negotiated as the operating speed is 96,000 rpm and the first flexural critical speed is over 200,000 rpm. This allows the operating range to be free of criticals except at the start sequence.

The compound shaft of the present invention provides for tuning or shifting of the rotor's rigid body and flexural critical frequencies. This provides flexibility in selecting the operating speed range of the turbomachine shaft. In most cases, a wide operating range is desirable over which there should be no rigid body or flexural criticals that need to be negotiated during normal operation. This spread is achieved by lowering the rigid body critical frequencies and increasing the first flexural critical frequency. There are a number of factors which can affect frequencies of the rigid body criticals and the frequency of the first flexural critical. The length of the quill shaft between the flexible disk members and the thickness of the flexible disk, for example, can significantly affect the frequency of the first flexural critical; the shorter the quill shaft, the higher the frequency.

The double flexure provides an additional degree of freedom by allowing shear decoupling of the two stiff shafts. The decoupled system is less sensitive to shaft misalignment and imbalance. The operating speed range is free of rotor criticals. Torque and axial loads are transmitted while allowing for misalignment.

While specific embodiments of the present invention have been illustrated and described, it is to be understood that these are provided by way of example only. While the compound shaft has been particularly described for use in a permanent magnet turbogenerator, it should be recognized that the compound shaft of the present invention is applicable to any turbomachine or rotating machine which can utilize or requires a compound shaft. The invention is not to be construed as being limited thereto but only by the proper scope of the following claims.

What we claim is:

1. A compound shaft comprising:

a first stiff shaft;

a flexible disk shaft having a pair of flexible disks and a quill shaft disposed between and connecting said pair of flexible disks;

a tie bolt shaft having a generally cup shaped member at one end thereof; and a second stiff shaft removably mounted upon said tie bolt shaft, one of said pair of flexible disks of said flexible disk shaft interference fit with said first stiff shaft and the other of said pair of flexible disks of said flexible disk shaft interference fit with said generally cup shaped member of said tie bolt shaft.

2. The compound shaft of claim 1 wherein said second stiff shaft is a power head shaft.

3. The compound shaft of claim 2 wherein said power head shaft includes a compressor wheel hub, a bearing rotor, and a turbine wheel hub.

4. A compound shaft comprising:

a first stiff shaft having a hollow sleeve at one end thereof;

a tie bolt shaft having a generally cup shaped member at one end thereof;

a second stiff shaft removably mounted upon said tie bolt shaft; and a flexible disk shaft having a pair of flexible disks and a quill shaft disposed between and connecting said pair of flexible disks, one of said pair of flexible disks of said flexible disk shaft interference fit over the hollow sleeve of said first stiff shaft and the other of said pair of flexible disks of said flexible disk shaft interference fit into said generally cup shaped member of said tie bolt shaft.

5. The compound shaft of claim 4 wherein the thickness of each of said pair of flexible disks of said flexible disk shaft generally decreases radially outward.

6. The compound shaft of claim 5 wherein the radial extending surface of each of said pair of flexible disks of said flexible disk shaft facing away from said quill shaft is radially flat and the radial extending surface of each of said flexible disks of said flexible disk shaft facing said quill shaft is radially tapered to produce the generally radially outwardly decreasing thickness of each of said flexible disks.

7. The compound shaft of claim 5 wherein the radial extending surface of each of said pair of flexible disks of said flexible disk shaft facing said quill shaft is radially tapered and the radial extending surface of each of said flexible disks of said flexible disk shaft facing away from said quill shaft is radially tapered to produce the generally radially outwardly decreasing thickness of each of said flexible disks.

8. The compound shaft of claim 5 wherein the radial extending surface of each of said pair of flexible disks of said flexible disk shaft facing said quill shaft is radially flat and the radial extending surface of each of said flexible disks of said flexible disk shaft facing away from said quill shaft is radially tapered to produce the generally radially outwardly decreasing thickness of each of said flexible disks.

9. The compound shaft of claim 4 wherein said pair of flexible disks of said flexible disk shaft are generally cup shaped.

10. The compound shaft of claim 4 wherein the thickness of each of said pair of flexible disks of said flexible disk shaft is generally radially uniform.

11. The compound shaft of claim 4 wherein said second stiff shaft is a power head shaft mounted in compression upon said tie bolt shaft.

12. The compound shaft of claim 11 wherein said power head shaft includes a compressor wheel hub, a bearing rotor, and a turbine wheel hub.

13. A compound shaft comprising:

a first stiff shaft;

a flexible disk shaft having a pair of flexible disks and a quill shaft disposed between and connecting said pair of flexible disks;

a tie bolt shaft having a generally cup shaped member at one end thereof; and a second stiff shaft including a compressor wheel, a bearing rotor, and a turbine wheel removably mounted upon said tie bolt shaft, one of said pair of flexible disks of said flexible disk shaft interference fit with said first stiff shaft and the other of said pair of flexible disks of said flexible disk shaft interference fit with said generally cup shaped member of said tie bolt shaft.

14. A compound shaft comprising:

a first stiff shaft having a hollow sleeve at one end thereof;

a tie bolt shaft having a generally cup shaped member at one end thereof;

a second stiff shaft including a compressor wheel, a bearing rotor, and a turbine wheel removably mounted in compression upon said tie bolt shaft; and a flexible disk shaft having a pair of flexible disks and a quill shaft disposed between and connecting said pair of flexible disks, one of said pair of flexible disks of said flexible disk shaft interference fit over the hollow sleeve of said first stiff shaft and the other of said pair of flexible disks of said flexible disk shaft interference fit into said generally cup shaped member of said tie bolt shaft.

* * * * *

UNITED STATES PATENT AND TRADEMARK OFFICE
CERTIFICATE OF CORRECTION

PATENT NO : 5,964,663
DATED : October 12, 1999
INVENTOR(S) : Matthew J. Stewart et al.

It is certified that error appears in the above-identified patent and that said Letters Patent is hereby corrected as shown below:

Column 1, line 37, change "filatively" to --relatively--
Column 3, line 10, change "it" to --is--
Column 3, line 43, after "thereof" insert --.--

Signed and Sealed this

Eleventh Day of April, 2000

*Attest:*

Q. TODD DICKINSON

*Attesting Officer*

*Director of Patents and Trademarks*